United States Patent [19]

Miwa et al.

[11] Patent Number: 5,070,588
[45] Date of Patent: Dec. 10, 1991

[54] PROCESS FOR PRODUCING CERAMIC HONEYCOMB STRUCTURE EXTRUSION DIES

[75] Inventors: Masaaki Miwa, Aichi; Yoshihito Shiji, Kasugai, both of Japan

[73] Assignee: NGK Insulators, Ltd., Japan

[21] Appl. No.: 497,896

[22] Filed: Mar. 23, 1990

[30] Foreign Application Priority Data

Mar. 23, 1989 [JP] Japan .................. 1-69172

[51] Int. Cl.$^5$ ............................. B23Q 17/00
[52] U.S. Cl. ..................... 29/407; 29/527.4; 29/558; 427/8; 427/239; 427/237; 427/292
[58] Field of Search ............... 427/8, 239, 292, 237; 29/407, 557, 558, 527.2, 527.4; 264/177.12

[56] References Cited

U.S. PATENT DOCUMENTS 3,038,201 6/1962 Harkenrider .

FOREIGN PATENT DOCUMENTS

| | | |
|---|---|---|
| 50-75611 | 6/1975 | Japan . |
| 55-41908 | 10/1980 | Japan . |
| 57-61592 | 12/1982 | Japan . |
| 60-145804 | 8/1985 | Japan . |
| 61-69968 | 4/1986 | Japan . |
| 61-39167 | 9/1986 | Japan . |
| 63-176107 | 7/1988 | Japan . |

Primary Examiner—Timothy V. Eley
Attorney, Agent, or Firm—Parkhurst, Wendel & Rossi

[57] ABSTRACT

A process for producing a ceramic honeycomb extrusion die including at least ceramic material feed holes and forming channels. The process includes the steps of preparing a ceramic honeycomb extrusion die base body having a given size by machining, detecting differences in extruding speeds of a ceramic material extruded through the forming channels, sealing of openings of the ceramic material feed holes corresponding to the forming channels having greater extruding speeds of the ceramic material based on the detected differences, feeding the ceramic material through the ceramic material feed holes corresponding to the forming channels having smaller extruding speeds of the ceramic material, and repeating the preceding steps number of times necessary for adjusting and substantially making uniform flow resistance of all ceramic material flow paths of the entire die. The ceramic material flow paths are constituted by the ceramic material feed holes and the forming channels.

9 Claims, 6 Drawing Sheets

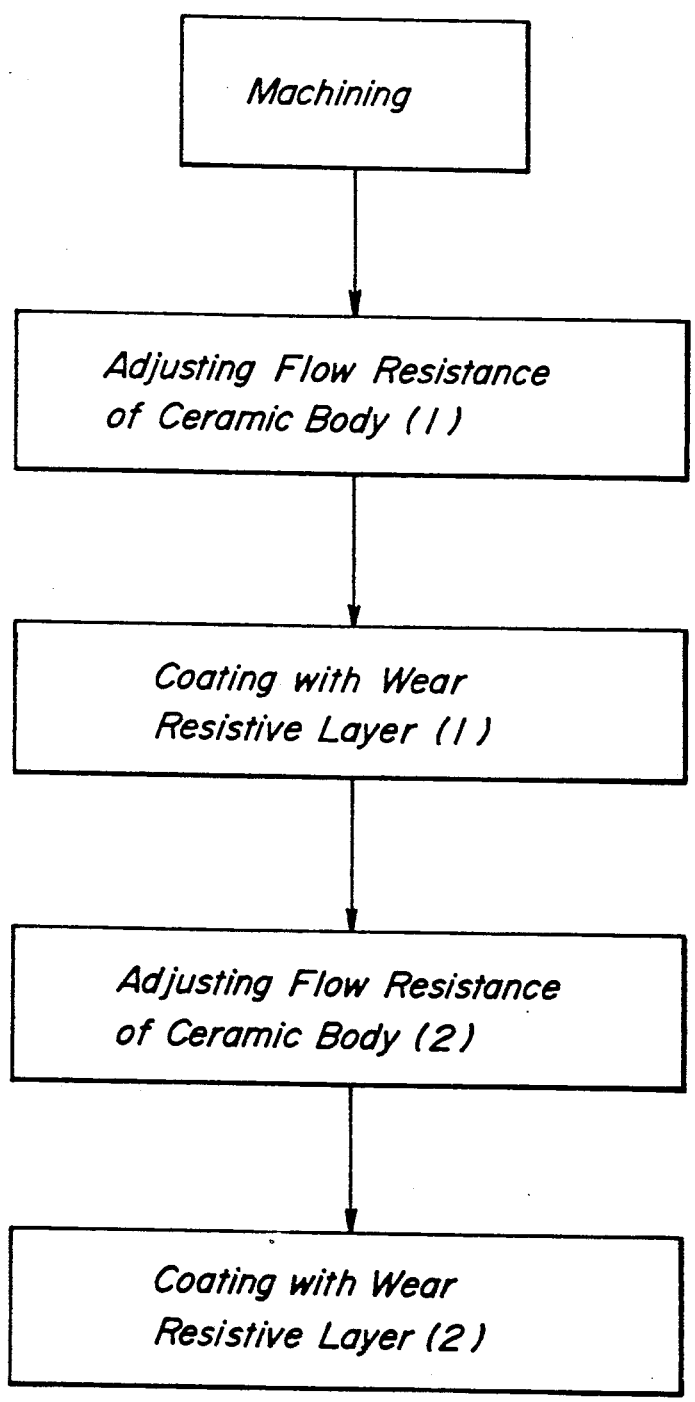
FIG_1

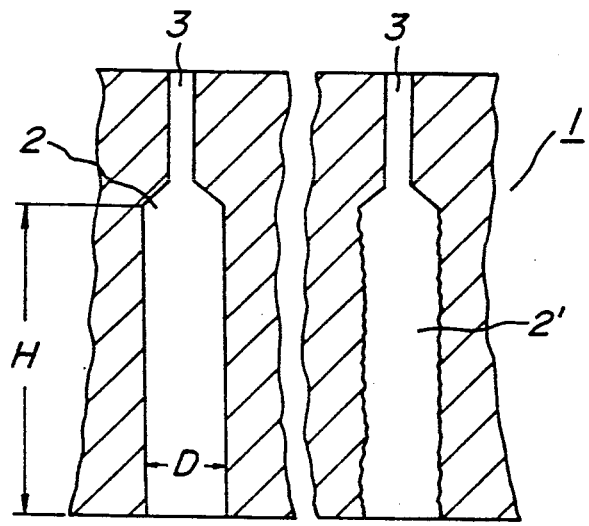
FIG._2A
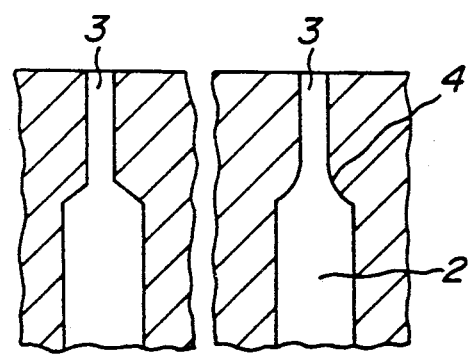
FIG._2B
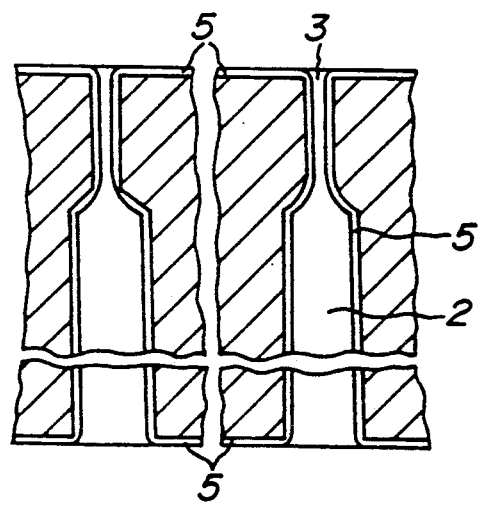
FIG._2C

FIG._3A
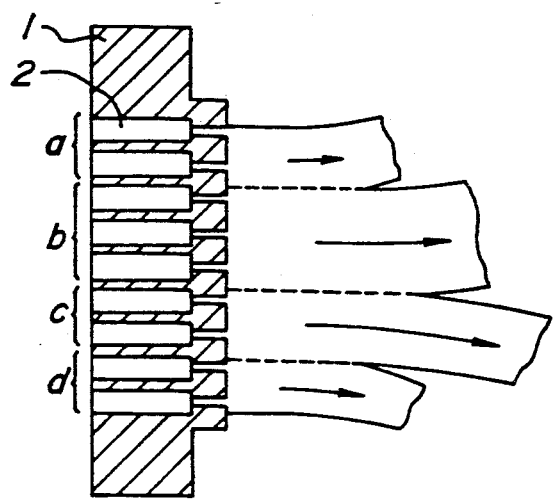
FIG._3B
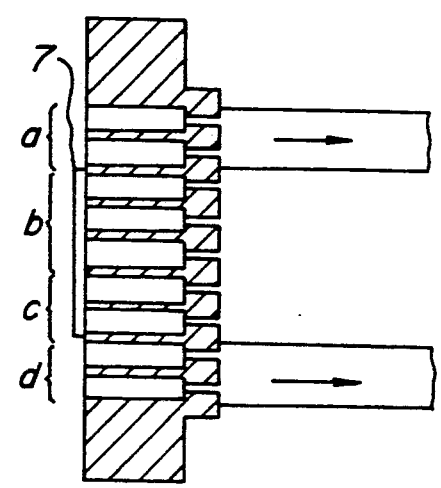
FIG._3C
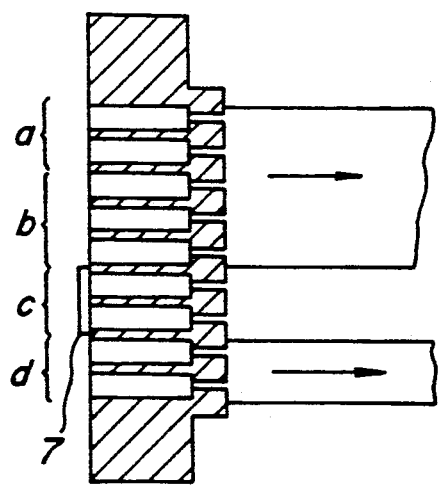
FIG._3D
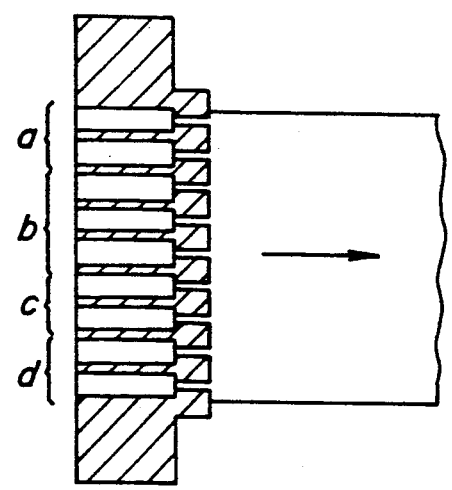

FIG._4A
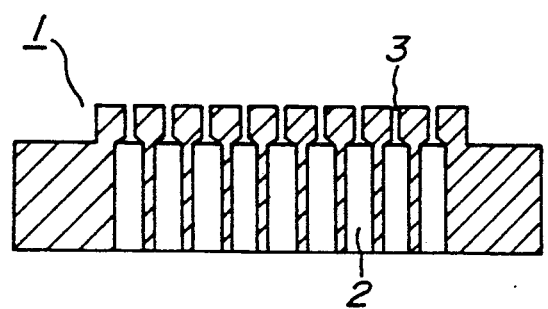
FIG._4B
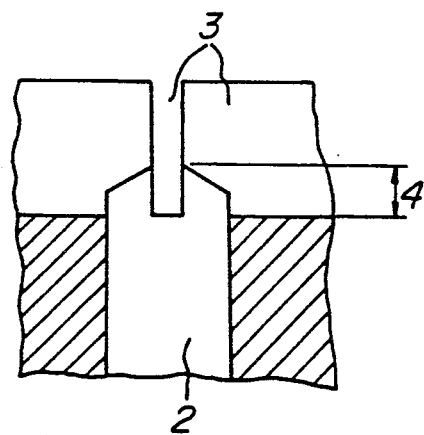

(Nomal)  (Rough Surface)  (Not Straight)

PROCESS FOR PRODUCING CERAMIC HONEYCOMB STRUCTURE EXTRUSION DIES

BACKGROUND OF THE INVENTION

1. Field of the Invention

The present invention relates to extrusion dies for the production of ceramic honeycomb structures to be used as catalyst carriers, filters, heat exchangers and the like for the purification of exhaust gases.

2. Related Art Statement

Ceramic honeycomb structural bodies are now used as catalyst carriers for the purification of exhaust gases from internal combustion engines, filters for the removal of soot and dusts in exhaust gases from diesel engines and rotary type heat exchangers.

Japanese Patent Application Laid-open No. 50-75,611 (corresponding to U.S. Pat. No. 3,885,977) discloses a process for producing such ceramic honeycomb structural bodies, in which cordierite is formed by extrusion. Japanese Patent Publication Nos. 55-41,908 (corresponding to U.S. Pat. No. 3,790,654) and 57-61,592 (corresponding to U.S. Pat. No. 3,905,743) disclose extrusion dies 1 as shown in FIGS. 4(A) and 4(B), in which ceramic material feed holes 2 are opened in one surface for receiving a ceramic material through an extrusion machine, and forming channels 3 are opened in the other surface corresponding to a sectional matrix of a ceramic honeycomb structural body, while intersecting sections 4 are provided between the feed holes 2 and the forming channels 3.

Although not shown, U.S. Pat. No. 3,308,201 disclose dies in which stagnating portions are formed between ceramic material feed holes and forming channels for temporarily stagnating the body.

Furthermore, Japanese Patent Publication No. 61-39,167 discloses a technique for producing extrusion dies, in which forming channels are worked by machining and/or by discharging, and then electrolessly plated to form forming channels having a given width.

In addition, in order to prolong use life of extrusion dies, dies are known in which an electrolessly plated composite layer consisting of electroless plating and wear resistive grains is deposited on surfaces of ceramic material feed holes and forming channels [Japanese Patent Application Laid-open No. 63-176,107 (corresponding to U.S. Pat. No. 4,861,626)], and dies are also known in which a wear resistive material is chemically vapor deposited thereon. [Japanese patent application Laid-open Nos. 60-145,804 (corresponding to U.S. Pat. No. 4,574,459) and 61-69,968].

However, the conventional processes for producing ceramic honeycomb structural bodies have the following drawbacks.

Although the conventional processes have a merit that honeycomb structural bodies having thin walls can be mass produced, it often occurs that the conventional dies frequently cause honeycomb structural bodies to deform or to suffer troubles such as warpage during extrusion, or deformation or cracking after firing at the starting of use of such dies. Under the circumstances, the present inventors have examined causes therefor, and discovered that these troubles are due to nonuniform dimensional accuracy and surface roughness of the ceramic material feed holes or forming channels of the die.

That is, the honeycomb structure-extrusion die has a number of ceramic material feed holes and forming channels, and their dimensions are very small. Further, the depth of the material feed holes is deeper as compared with the inner diameter thereof. For instance, when a honeycomb structural body having a cell density of 400 cells/inch$^2$, a square cell sectional shape, an outer diameter of 180 mm and a wall thickness of 0.15 mm is to be obtained by extrusion, it is necessary that the inner diameter and the depth of the material feed holes are 1.3 mm and 17 mm, respectively, and the number of feed holes is about 3,400. Further, it is necessary that the width of the forming channels is about 0.17 mm and the forming channels are provided at the number of about 100 in each of transverse and longitudinal directions.

Therefore, it is difficult to uniformly machine the material feed holes and the forming channels. As schematically shown in FIG. 5, the surface roughness and the straightness of the material feed holes 2 vary. When the ceramic material is extruded by using the thus machined die, the flow resistance of the ceramic material varies depending upon the material flow paths of the die. Thus, a honeycomb structural material having a uniform face in a direction orthogonal to the extruding direction cannot be extruded. Rather, the shape of a head of the extruded structure 9 is nonuniform as shown in FIG. 6. Even if the thus extruded material is not cracked or greatly deformed during the extrusion, a desired dimension cannot be obtained due to residual stresses inside the extruded structure or the walls of the cells in the honeycomb structure are cracked due to the residual stresses, when the extruded structure is dried and fired.

In order to solve the problems mentioned above, the surface roughness and the dimensional accuracy of the material feed holes and the forming channels can be made uniform by honing or reaming the surfaces thereof, but this unfavorably increases the number of working steps. On the other hand, if the ratio of the depth of the material feed holes to the diameter thereof is great, the surface roughness becomes more nonuniform, which makes the above honing or reaming difficult. In this case, a bonding-die technique in which a forming section and a feed hole section are separately machined and bonded together, is available. However, this technique suffers from an excessive number of working steps.

Further, another conventional technique is also available, in which the dimension of the material feed holes or the forming channels is adjusted by electrolessly plating them to prolong use life. However, the present inventors recognized that the speed at which the honeycomb structure is extruded through the forming channels more or less differs in the above case, and that the differences in the extruding speed cause the troubles.

SUMMARY OF THE INVENTION

Therefore, it is an object of the present invention to produce a die in which the flow resistance against the ceramic material is uniform to obtain sound ceramic honeycomb structures.

Further, it is another object of the present invention to inexpensively produce a die.

The present invention has been accomplished to solve the above-mentioned problems, and relates to a process for producing a ceramic honeycomb-extruding die comprising at least ceramic material feed holes and forming channels, and being characterized by the steps of preparing a ceramic honeycomb-extrusion die base body having a given dimension by machining, and then adjusting the flow resistance against the ceramic material by polishing surfaces of the material feed paths through feeding the ceramic material through the die base body.

Since the material flow resistance is adjusted by polishing the material flow paths in the die with the ceramic material according to the process for producing the ceramic honeycomb-extrusion die in the present invention, sound ceramic honeycomb structure having few residual stresses can be obtained.

These and other objects, features and advantages of the invention will be appreciated upon reading of the invention when taken in conjunction with the attached drawings, with the understanding that some modifications, variations and changes of the same could be made by the skilled person in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a flow chart illustrating the process for producing the ceramic honeycomb structure-extrusion die according to the present invention;

FIGS. 2(A) through (E) are sectional views of principal portions of extrusion dies produced in the order of steps in the production process according to the present invention;

FIGS. 3(A) through (D) are sectional views for illustrating a manner of adjusting flow resistance of ceramic material according to the present invention;

FIGS. 4(A) and (B) are sectional views of conventional extrusion dies;

DETAILED DESCRIPTION OF THE EMBODIMENTS

Figure 2D:
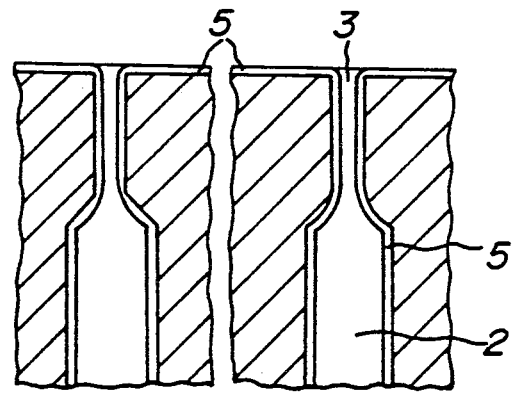

The present invention will be explained in detail mainly with reference to FIG. 1 illustrating a flow chart showing an example of the process for producing a ceramic honeycomb structure-extrusion die according to the present invention by employing a die structure (FIG. 4) disclosed in the above Japanese Patent Publication No. 57-61,592 (U.S. Pat. No. 3,905,743) by way of example.

In a first machining step, basic dimension and shape of the honeycomb structure-extrusion die are attained by machining.

As shown in FIG. 2(A), ceramic material feed holes 2 and forming channels 3 are formed in the honeycomb structure-extrusion die 1 by machining.

The ceramic material feed holes 2 are formed to receive the ceramic material through an extruder under pressure and uniformly distribute it into the forming channels. The inner diameter D and the depth H of the material feed holes 2 and the arrangement and the number of the feed holes relative to the forming channels are determined by shape factors of the honeycomb structure such as the density of cells, the thickness of walls, and the surface area, a ceramic material used, extruding conditions, etc. For example, in the case of a cordierite honeycomb structure having an outer diameter of 118 mm, the cell density of 400 cells per inch$^2$, and the wall thickness of 0.15 mm, about 3,400 of material feed holes 2 having an inner diameter of about 1.0 to 1.5 mm and a depth (H) of 18-36 mm are formed in a die. When a number of very small material feed holes are machined by a drill, as shown in the right of FIG. 2(A), the material feed holes 2' in which surface roughness is great and the axis is deviated are formed due to wearing or axial deviation of the drill.

The material channels 3 determine the shape corresponding to that of the sectional shape of the ceramic honeycomb structure to be extruded, that is, the shapes of the cells, which are ordinarily polygonal, triangular, rectangular, or hexagonal, or circular. The width defining the dimension of the partition walls of the honeycomb structural body is ordinarily 1.0 to 0.08 mm. Further, a considerable number of forming channels are necessary corresponding to the cell density of the honeycomb structure and the outer diameter of the die.

Therefore, since it is difficult to form such numerous forming channels having a very small width, it is effective to form channels having a width greater than the specified one by a wire saw or discharging as disclosed in Japanese patent publication No. 61-39,167. The technique, in which channels and holes are machined in a size greater than a desired one is used for machining the above material feed holes.

The machining of the material feed holes and the forming channels defining the fundamental configuration of the honeycomb structure have been explained above When a die is to be produced as in the above-explained conventional case in which stagnating portions are formed at intersecting portion between the ceramic material feed holes and the forming channels for temporarily stagnating the material, the stagnating portions may be formed by forming grooves through cutting. In this case, a portion having the forming channels, and a portion having the material feed holes and the stagnating portions may separately be formed, and then bonded together.

The outer shape of the die may be machined by a lathe or planar grinder to fit the die to an extruding machine.

A steel, tool steel or stainless steel and so on, may be used as the material for the die. A hard metal such as tungsten carbide may be used as a portion of the die in which the forming channels are formed.

The machining has been explained above in the first step. However, this machining should not be interpreted literally but rather, includes an electro-discharge machining, an electrochemical machining and a combination thereof.

The ceramic honeycomb-extrusion die machined in a fundamental shape in the first step is subjected to a step for adjusting the ceramic material flow resistance. This flow resistance-adjusting step is fundamentally to remove unevenness of the surface roughness of the ceramic material feed holes and the forming channels.

The flow resistance is adjusted by wearing the surfaces of material flow paths, the material feed holes and the forming channels, through extruding the ceramic materials. This method is that the material is passed through those material feed holes and forming channels which have poor surface roughness and great flow resistance, thereby wearing them and reducing their material flow resistance. That is, as shown in FIG. 2(B), the surface roughness of the material feed holes 2 is improved by passing the material through the die of FIG. 2(A). When defects such as uneven surface roughness occurring in the first step are relatively small, it is sufficient that the extrusion die is attached to the extruding machine, and the speed at which the honeycomb structure is extruded through the die is made uniform.

On the other hand, not only the above defect portions but also the intersecting portions 4 between the material feed holes and the forming channels are worn with the material in the case where the die is also provided with the stagnating portions, not only the above defect portion but also the intersecting portions between the forming channels and stagnating portions are worn with the material. The reason is that the flow resistance is increased due to rapid change in the sectional area of the material flow paths at these intersecting portions 4, and that the curvature is discontinuous there because the intersecting portion are contacts between portions formed by different machining. Further, it may be intrinsically impossible to shape the intersecting portions by machining in a curved surface for reducing the flow resistance during extruding. Therefore, when the defects are relatively great, before the adjustment of the defects is completed, the intersecting portions having smaller defects are worn faster. Consequently, adjustment of the flow resistance of the entire die becomes impossible.

In such a case, it is preferable to employ a partially adjusting method. As shown in FIG. 3(A), the distribution of the flow resistance is examined by first feeding the ceramic material to the entire material feed holes 2 of the die 1. Then, as shown in FIG. 3(B), openings of the material feed holes b and c corresponding to the forming channels which have smaller flow resistance, i.e., the forming channels through which the material is extruded faster, are closed with a planar mask 7 made of plastic or the like, and then the ceramic material is fed to the material feed holes a and d corresponding to the forming channels having greater flow resistance for adjusting the flow resistance. Next, as shown in FIG. 3(C), while the material feed holes c having the smallest flow resistance in FIG. 3(A) are sealed, the flow resistance of the other portions is adjusted. By repeating the above operation, the die having more uniform flow resistance distribution can be obtained in FIG. 3(D) by wearing the material flow paths as shown.

The ceramic material used for adjusting the flow resistance may be a material capable of polishing the metallic material constituting the die. However, it is preferable that the ceramic material used for adjusting flow resistance is the same as the ceramic material actually extruded to form a ceramic honeycomb structure. The reason is that the flow resistance can be adjusted to meet the requirements for the actual extruding. When the ceramic honeycomb structures are made of cordierite as described in Japanese patent application Laid-open No. 50-75,611 (U.S. Pat. No. 3,885,977), the flow resistance is adjusted with a cordierite material.

As shown in FIG. 2(C), a next step is to apply a wear-resistance layer 5 to the surfaces of the material feed holes 2 and the forming channels 3 worn in the preceding step.

In the case of the ceramic honeycomb structural bodies having a smaller cell density and a relatively great wall thickness or in the case of the production in a small quantity, the honeycomb extrusion die may be used as it is obtained in the preceding step. However, in order to prolong the use life of the die or to produce the ceramic honeycomb structural bodies having a thin wall thickness, the surfaces of the above material flow paths are coated with the wear resistance layer.

As shown in Japanese patent publication No. 61-39,167, the wear resistive layer is formed by applying an electroless nickel plating onto the surfaces of the material flow paths such as the material feed holes and the forming channels through deposition. The deposited thickness may be set to correspond to the wall thickness of the honeycomb structure to be extruded. As mentioned later, in case that the electroless nickel plated layer is further coated with a wear resistive layer, the thickness of the plated layer is reduced by that of the wear resistive layer.

In the case of the electroless nickel plating using nickel hypophosphate as a reducing agent, harder surfaces can be obtained by crystallizing the Ni layer through heat treatment after the deposition.

In the case of dies requiring higher wear resistance as in the electroless nickel plating, as shown in Japanese patent application Laid-open No. 63-176,107 (U.S. Pat. No. 4,861,626), the electroless Ni-plated layer is coated with a composite electrolessly plated layer containing particles of silicon carbide or the like. Alternatively, as disclosed in Japanese patent application Laid-open No. 60-145,804 (U.S. Pat. No. 4,574,459), titanium nitride or titanium carbonitride is deposited through CVD. In order to regenerate a partially worn die having the nitride or the carbide deposited, it is effective to apply no chemical vapor deposition onto end faces of the material feed holes by masking them with an appropriate means so that the vapor deposited layer and the underlying nickel layer may chemically easily be removed through dissolving.

The reason why the wear resistive coating is laminated onto the electroless plating layer is that the deposition speed is slow in the case of the composite plating. Particularly, when the die for the production of the honeycomb structure having thin walls is to be produced, it is possible to effectively shape the forming channels in a desired size. Further, with respect to the chemical vapor deposition, it is to make it possible to peel the chemically deposited layer for recoating and to mitigate the thermal strain due to differences in thermal expansion between TiC, TiN, TiCN, or the like applied by CVD and the steel as the base material of the die.

Figure 2E:
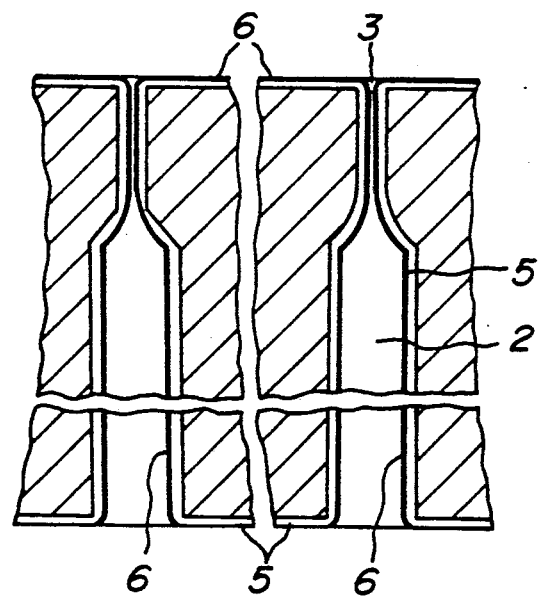
Figure 5:
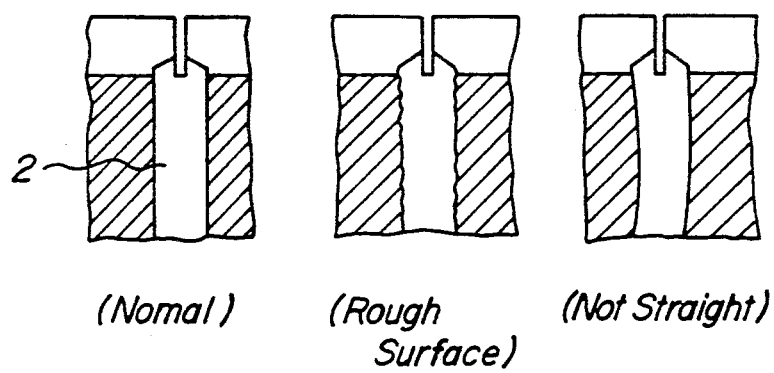
FIG. 5 is a partially sectional view of a principal portion of a conventional extrusion die.
Figure 6:
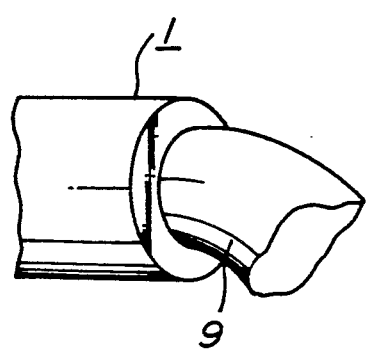
FIG. 6 is a schematic view for illustrating a case where the ceramic honeycomb structure is extruded by using the conventional extrusion die.

When the thickness of the wear resistive coated layer is relatively large, the ceramic material flow resistance in the preceding adjusting step frequently varies. The reason is that even when the electroless plating layer is uniformly deposited, the material flow resistance varies due to its greater thickness. In such a case, as shown in FIG. 2(D), the ceramic material flow resistance may be adjusted again in the same manner as explained in the above second step with respect to the extrusion die upon which the electroless plating is applied. As shown in FIG. 2(E), the die 1 in which the surfaces of the material flow paths are formed with the wear resistive layers 6 by chemical vapor deposition or composite plating to form the second layer as the second wear resistive layer 6.

As mentioned above, according to the process for producing the ceramic extrusion die in the present invention, a die having a long, usable life can be produced by a simple method, which uniformly flows the ceramic material through the die during the extruding so that the resultant ceramic honeycomb structures are free from defects.

What is claimed is:

1. A method of producing a honeycomb extrusion die including a plurality of flow paths each comprising a feed hole and a forming channel, the die having substantially uniform flow resistance, the method comprising the steps of:
   (a) machining feed holes and forming channels of a honeycomb extrusion die to a given size;
   (b) extruding material through all of the forming channels of the die;
   (c) detecting differences in extrusion speeds of the material when extruded through various forming channels;
   (d) sealing openings of feed holes corresponding to forming channels in which extrusion speeds of the material are highest;
   (e) feeding the material through feed holes corresponding to forming channels in which extrusion speeds of the material are lowest;
   (f) unsealing openings of feed holes corresponding to forming channels in which extrusion speeds of the material are lowest; and
   (g) repeating the steps of (e) and (f) for a number of times sufficient to adjust all flow paths of the die to have substantially uniform flow resistance.

2. The method of claim 1, wherein the material extruded through the flow paths is a ceramic material and a body formed by the extrusion die has a honeycomb structure.

3. The method claim 1, furthe comprising the step of (h) forming a wear resistive layer on wall surfaces of each of the flow paths after the flow resistance is adjusted in the step (g).

4. The method of claim 3, wherein the wear resistive layer is formed by electroless plating using Ni.

5. The method of claim 3, wherein the wear resistive layer is formed by CVD.

6. The method of claim 3, further comprising the steps of:
   (i) extruding the material through all of the forming channels of the die after the wear resistive layer is formed on the wall surfaces of each of the flow paths;
   (j) detecting differences in extrusion speeds of the material when extruded through various forming channels;
   (k) sealing openings of feed holes corresponding to forming channels in which extrusion speeds of the material are highest;
   (l) feeding the material through feed holes corresponding to forming channels in which extrusion speeds of the material are lowest;
   (m) unsealing openings of feed holes corresponding to forming channels in which extension speeds of the material are lowest; and
   (n) repeating the steps (l) and (m) for a number of times sufficient to adjust all flow paths of the die to have substantially uniform flow resistance.

7. The method of claim 6, wherein a second wear resistive layer is formed on the wall surfaces of each of the flow paths after the flow resistance of the flow paths is adjusted in the step (n).

8. The method of claim 7, wherein the second wear resistive layer is formed by composite electroless plating.

9. The method of claim 8, wherein the second wear resistive layer is formed by CVD.

* * * * *